(12) United States Patent
De Bougrenet et al.

(10) Patent No.: US 11,754,834 B2
(45) Date of Patent: Sep. 12, 2023

(54) OPTICAL SYSTEM FOR DETECTING AND TRACKING EYE MOVEMENTS, ASSOCIATED EXTERNAL FRAME AND ASSOCIATED CONNECTED CONTACT LENS

(71) Applicant: INSTITUT MINES-TELECOM, Paris (FR)

(72) Inventors: Jean-Louis De Bougrenet, Guilers (FR); Cyril Lahuec, Lampaul Plouarzel (FR); Vincent Nourrit, Brest (FR); Fabrice Seguin, Morlaix (FR); Francesco Ferranti, Brest (FR)

(73) Assignee: INSTITUT MINES-TELECOM, Paris (FR)

( * ) Notice: Subject to any disclaimer, the term of this patent is extended or adjusted under 35 U.S.C. 154(b) by 460 days.

(21) Appl. No.: 17/044,546

(22) PCT Filed: Apr. 3, 2019

(86) PCT No.: PCT/EP2019/058355
§ 371 (c)(1),
(2) Date: Oct. 1, 2020

(87) PCT Pub. No.: WO2019/193028
PCT Pub. Date: Oct. 10, 2019

(65) Prior Publication Data
US 2021/0157133 A1    May 27, 2021

(30) Foreign Application Priority Data
Apr. 4, 2018   (FR) ...................................... 1852903

(51) Int. Cl.
*G02B 27/00* (2006.01)
*G02C 7/04* (2006.01)
(Continued)

(52) U.S. Cl.
CPC .......... *G02B 27/0093* (2013.01); *G02C 7/04* (2013.01); *G02C 11/10* (2013.01); *G06F 3/011* (2013.01)

(58) Field of Classification Search
None
See application file for complete search history.

(56) References Cited

U.S. PATENT DOCUMENTS

2010/0220291 A1*  9/2010  Horning ................. G06V 40/19
                                                                351/210
2012/0281181 A1   11/2012  Chen et al.
(Continued)

FOREIGN PATENT DOCUMENTS

WO    WO2017196172    * 11/2017

OTHER PUBLICATIONS

International Search Report corresponding to international Application No. PCT/EP2019/058355 dated Jun. 25, 2019, 5 pages.
(Continued)

*Primary Examiner* — Aneeta Yodichkas
(74) *Attorney, Agent, or Firm* — Ronald M. Kachmarik; Cooper Legal Group LLC

(57) ABSTRACT

An optical system for detecting and tracking the eye movements of an individual. The system includes a frame, intended to be worn on the face of the individual, that includes a plurality of illumination sources. The system includes at least one contact lens, intended to be worn by an eye of the individual facing the frame, in which are encapsulated: an autonomous integrated circuit, a plurality of photoreceptors and a wireless communication transmitter. Variation in a signal (e.g., voltage or current) delivered by the photoreceptors allows not only the closure of the eyelid but also eye movements to be detected.

18 Claims, 3 Drawing Sheets

(51) Int. Cl.
*G02C 11/00* (2006.01)
*G06F 3/01* (2006.01)

(56) References Cited

U.S. PATENT DOCUMENTS

| | | | |
|---|---|---|---|
| 2014/0055746 A1* | 2/2014 | Nistico | A61B 3/107 351/206 |
| 2014/0081178 A1* | 3/2014 | Pletcher | A61B 3/10 600/595 |
| 2014/0198382 A1 | 7/2014 | Chen et al. | |
| 2017/0091550 A1* | 3/2017 | Feng | G06T 3/4061 |
| 2017/0112433 A1 | 4/2017 | Pugh et al. | |
| 2018/0027176 A1 | 1/2018 | Agell et al. | |

OTHER PUBLICATIONS

N. M. Farandos et al., "Contact lens sensors in ocular diagnostics", Advanced Healthcare Materials, vol. 4, No. 6, 4, pp. 792-810, Apr. 2015.

D. A. Robinson, "A Method of Measuring Eye Movement Using a Sceral Search Coil in a Magnetic Field" IEEE Transactions on Bio-medical Electronics, vol. 10, No. 4, pp. 137-145, Oct. 1963.

S. B. Ryann, K. L. Detweiler, K. H. Holland, M. A. Hord, V. Bracha, "A long-range, wide field-of-view infrared eyeblink detector", Journal of Neuroscience Methods, vol. 152, No. 1, pp. 74-82, 2006.

A. Nanditha Sree and A. Balaji Ganesh, "Experimental study report on Opto-electronic sensor based gaze tracker system," 2011 International Conference on Emerging Trends in Electrical and Computer Technology, Tamil Nadu, 2011, pp. 567-570.

AC Sensimed "Triggerfish", http://www.sensimed.ch/fr/.

https://phys.org/news/2017-05-solution-precise-low-cost-eye-movement.html, 2017.

E. Whitmire, L. Trutoiu, R. Cavin, D. Perek, B. Scally, J. Phillips, S. Patel, "EyeContact: Scleral Coil Eye Tracking for Virtual Reality", Proceedings of the 2016 ACM International Symposium on Wearable Computers, pp. 184-191, New York, NY, USA, 2016.

A. Frigerio, T. A. Hadlock, E. H. Murray, J. T. Heaton, "infrared-based blink detecting glasses for facial pacing: towards a bionic blink", JAMA facial plastic surgery, vol. 16, No. 3, pp. 211-218, 2014.

J.-C. Chiou, Y.-C. Huang, G.-T. Yeh, "A capacitor-based sensor and a contact lens sensing system for intraocular pressure monitoring", Journal of Micromechanics and Microengineering, vol. 26, No. 1, 2016.

* cited by examiner

OPTICAL SYSTEM FOR DETECTING AND TRACKING EYE MOVEMENTS, ASSOCIATED EXTERNAL FRAME AND ASSOCIATED CONNECTED CONTACT LENS

TECHNICAL FIELD

The present invention relates to an optical system for detecting and tracking eye movements of an individual combined with an external frame associated with a contact lens connected for implementation.

The lens is a completely autonomous system in at least one eye of an individual. The frame may be a spectacle frame or a frame integrated into an augmented reality headset, or a head-up display (HUD) screen.

The applications of the present invention are numerous, among which may be mentioned: remote visual control, the supervision of surgical operations, fatigue detection, etc.

PRIOR ART

The production of devices for measuring the attitude or physiological parameters of the gaze has been and is currently the subject of numerous developments.

In particular, connected smart contact lenses have been developed: [1].

In general, measurements of physiological parameters, for example measurement of intraocular pressure IOP [2], [3], or measurement of fluids, such as for glycemia [1] have been proposed and are the subject of commercial products.

Furthermore, it has already been proposed to integrate a passive antenna into a contact lens, to detect the orientation of the gaze: [4].

Patent application US2012/281181, filed by SONY, describes a recent implementation of such an integration, for video game applications.

For the concomitant measurement of the position and kinetics of oculometric parameters, such as the orientation of the gaze, saccades and blinking of the eyelids, it has already been proposed to use a device that does not employ on-board cameras, followed by image processing. Reference may be made to publication [5] or to patent application US2012/0281181.

The proposed devices that do without on-board cameras are advantageous. Specifically, it may be the case that the cameras are low-cost and they do not then allow the measurement of fast movements because their acquisition frequency is too low and/or they provide noisy images of poor quality, thus requiring processing that slows the rate. Otherwise, they are high-performance but not very compact and more expensive.

Another technique which has been updated uses an electro-oculographic system, as described in patent applications US2012/0281181, US2014/0198382, US2018/0027176.

In such a system, the closure and positions of the eye are determined by acquiring data from the biosignal, for example an electro-oculogram (EOG).

To do this, it has been proposed to implement a magnetic contact lens, the movement of which is detected by magnetic sensors. Thus, in one embodiment, a small magnet deposited on the surface of the lens generates a magnetic field which is detected by external magnetic sensors. These are arranged at precise locations in relation to the face. These magnetic sensors detect small temporal variations in the intensity of the field due to movements of the eye.

Even more recently, a system has been produced with a magnetic circuit for detecting movement of the eye in order to sense a fluctuation in the power sent to the coil incorporated on the contact lens: [6]. The detection circuit is formed by another coil mounted in an external system, such as a spectacle frame. The fluctuation is caused by a change in alignment between the first and the second coil and thus is used to detect the movement of the eyes. This system is proposed to detect falling asleep following rapid eye movement (REM).

In eye movement detection applications, different types of movement detection may be required, such as horizontal and vertical movement, and twisting movement. Depending on the precision required and the type of movement detection, each technique of the prior art has its advantages and drawbacks.

Another solution consists in associating a communicating frame with a connected contact lens provided with optical sensors. The frame makes it possible to communicate information and transfer electrical energy to power the contact lens. This association, which has already been proposed, represents an advantageous alternative in terms of integration and miniaturization, considering the latest advances in flexible electronics.

Thus, it has been proposed to use light-emitting diodes (LEDs), emitting in the infrared so as not to interfere with vision, fitted to a spectacle frame, which illuminate infrared photoreceptors (IRP) of a contact lens or of the frame, in order to measure the frequency of blinking of the eye.

A first approach consisted in interrupting the direct IR beam between an LED and an IRP arranged on each side of the eye: [7].

Another approach chosen employed the interruption of a beam reflected by the eye, from an LED to an IRP arranged side by side on the frame [8], [9].

However, these two systems do not allow the movements of the eye to be detected, essential in an oculometry application, with sufficient precision and speed.

There is therefore a need to improve the systems for detecting and tracking eye movements, in particular by overcoming the aforementioned drawbacks.

The aim of the invention is to at least partially meet this need.

DESCRIPTION OF THE INVENTION

To do this, the subject of the invention is an optical system for detecting and tracking the eye movements of an individual, comprising:
- a frame, intended to be worn on the face of the individual, comprising:
  - a plurality of illumination sources,
- at least one contact lens, intended to be worn by an eye of the individual facing the frame, in which are encapsulated:
  - an autonomous integrated circuit, incorporating a processor for processing the signals,
  - a plurality of photoreceptors, suitable for being illuminated individually or not by the sources of the frame, the photoreceptors being electrically connected individually to the integrated circuit, the photoreceptors being arranged in the contact lens such that the processing by the processor of the signals transmitted by the photoreceptors makes it possible to know the relative positions and speeds of rotation of the eye and the blinking of the eyelid of the eye,
  - a wireless communication transmitter, connected to the processor of the integrated circuit, for transmitting the signals processed by the processor of the integrated circuit so that they are transferred to an external processor.

Preferably, the frame comprises a transmitting antenna that makes it possible to communicate and supply energy and the transmitter comprises an element for storing electrical energy, for example a micro-battery.

Thus, the invention essentially consists in directly integrating photoreceptors, preferably photodiodes, and an autonomous integrated circuit with a processor into a contact lens. The variation in the (voltage or current) signal delivered by the photoreceptors allows not only the closure of the eyelid but also eye movements to be detected.

A mathematical processing of the electrical signals from the photoreceptors, advantageously by calculating the centers of mass, by means of the processor of the integrated circuit in the lens makes it possible to obtain a better representation of the closing/opening times of the eyelid and of the relative positions of the eye.

The centers of mass may be calculated from two or more photoreceptors.

Calculating the centers of mass has the advantages of being straightforward and not consuming too much energy. In the context of the invention, other, more sophisticated types of processing may be provided.

The processing of the signal is performed for each eye by a contact lens according to the invention.

Then, the signals processed, independently by each lens, are sent by wireless communication and processed by a processor integrated into the frame. By correlating the information from the signals from the two contact lenses, the processor of the frame can correct any errors and extract the eye vergence information.

The solution according to the invention may make it possible to achieve an angular precision of less than 1° and an angular velocity of less than 500°/s, which levels of precision are not achieved by current commercial products or are difficult to achieve by the solutions according to the prior art, and in any case not in the context of embedded eye tracking which is robust and low-cost like the system according to the invention.

The frame may be a spectacle frame or an augmented reality headset or a head-up display (HUD) screen.

The illumination sources are preferably light-emitting diodes (LEDs) or vertical-cavity surface-emitting laser (VCSEL) diodes.

Advantageously, the illumination sources are arranged around the entire periphery of the frame rim.

The contact lens is preferably a hard or hybrid (semi-hard) scleral lens. A scleral lens has the advantage of not moving, which is advantageous for such a device on the eye.

Preferably, the illumination sources are arranged such that, when the frame and the contact lens are worn by the individual, their illumination cones at least partially overlap at the contact lens level.

According to a first variant, the illumination sources are arranged such that, when the frame and the contact lens are worn by the individual, they create a substantially uniform illumination over a planar surface tangent to the center of the contact lens.

According to a second variant, the illumination sources each comprise a shaping optic such that, when the frame and the contact lens are worn by the individual, they each create a light beam that is more concentrated toward a point on the contact lens.

The photoreceptors are preferably sensitive photodiodes, emitting radiation in the infrared, formed by light-emitting diodes (LEDs).

According to one advantageous embodiment, the system comprises a first group of photoreceptors, comprising at least four photoreceptors arranged by being distributed in pairs on either side of and at an equal distance from the axis of symmetry (X) of the contact lens, which is intended to be positioned horizontally when the lens is worn by the eye.

According to this embodiment, the four photoreceptors of the first group are advantageously distributed in pairs on either side of the axis of symmetry (Y) of the contact lens, which is intended to be positioned vertically when the lens is worn by the eye. This arrangement of photoreceptors of the first group makes it possible to measure the movements of the eye in the horizontal plane with great precision.

According to a second advantageous embodiment, the system comprises a second group of photoreceptors, comprising at least three photoreceptors arranged by being aligned along the axis of symmetry (Y) of the contact lens, which is intended to be positioned vertically when the lens is worn by the eye.

Advantageously, at least two photoreceptors of the second group are arranged in the upper portion of the contact lens. This arrangement of photoreceptors of the second group makes it possible to measure the orientation of the eye in the vertical axis and the blinking of the eyelids with great precision.

The photoreceptors are preferably each surmounted by an infrared chromatic filter. Such a filter makes it possible to overcome the problems due to ambient light (variations, noise, etc.).

According to one advantageous embodiment, the processing by the processor of the integrated circuit comprises the calculation of the centers of mass of the contributions of the electrical signals from the photodetectors.

The wireless communication transmitter may be a modulator associated with a radiofrequency (RF) antenna or an infrared (IrDA) transmitter.

The lens may comprise one or more reconfigurable control circuits, of SWIPT (acronym for "simultaneous wireless information and power transfer") type, that can be reconfigured by external instruction received by the RF antenna of the contact lens. These one or more control circuits make it possible to reconfigure some of the functions of the lens and through interaction with the external environment.

The contact lens may comprise means for recovering and converting mechanical, light or chemical energy from the tears of the eye, in order to supply the integrated circuit with electrical power.

The lens comprises means for storing electrical energy. It may be an electric micro-battery.

According to one embodiment, the frame comprises:
a wireless communication receiver, suitable for receiving the waves transmitted by the transmitter of said at least one contact lens;
a processor for processing the signals received by the receiver.

According to this embodiment and one advantageous variant, the system comprises two contact lenses, each intended to be worn by an eye of the individual, the processing of the signal by the processor of the frame being suitable for extracting the information on ocular vergence, on the center and on the direction of the gaze in space.

According to another advantageous variant, the wireless communication receiver is a modulator associated with a radiofrequency (RF) antenna or an infrared (IrDA) transmitter.

Advantageously, provision may be made to supply the components of the one or more lenses (photoreceptors, integrated circuit) with electrical energy by transmission from the RF antenna of the frame, the transmitted energy then being recovered by the RF antenna of the one or more contact lenses. In this case, the contact lens has the electronics required to convert the RF power into electrical supply power.

DETAILED DESCRIPTION

Further advantages and features of the invention will become more clearly apparent from reading the detailed description of the invention, given by way of non-limiting illustration with reference to following figures, in which.

Throughout the present application, the terms "vertical", "lower", "upper", "bottom", "top", "below" and "above" should be understood by reference to a spectacle frame and a contact lens as they are in the configuration worn by an individual.

Figure 1:
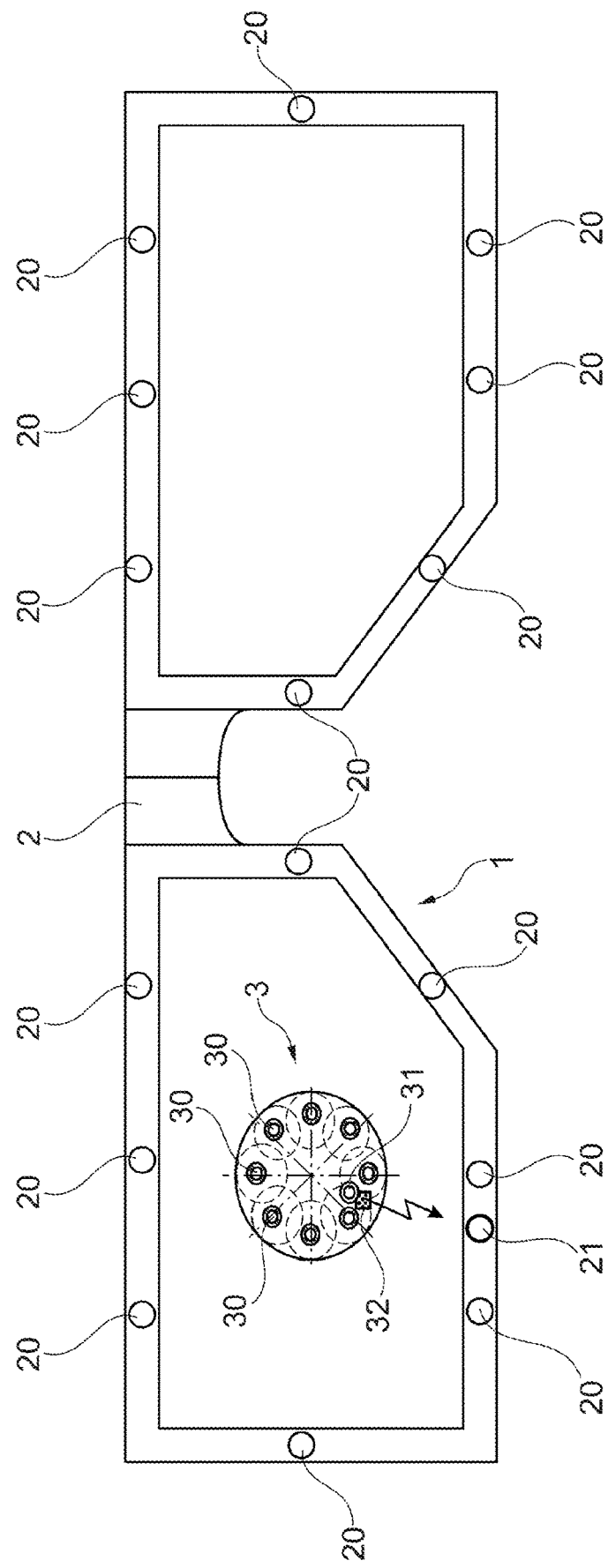
FIG. 1 is a schematic front view of an example of an optical system for detecting and tracking eye movements according to the invention with a spectacle frame and a contact lens according to the invention in their positions worn by the face and eye of an individual, respectively
Figure 2:
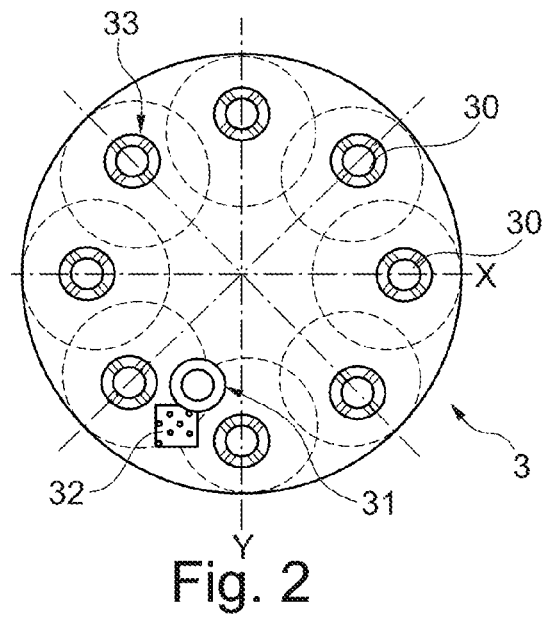
FIG. 2 is a front view of an example of a contact lens according to the invention.

FIG. 1 shows an optical system, denoted overall by the reference 1, for detecting and tracking the eye movements of an individual.

In a first embodiment, the optical system 1 according to the invention comprises a spectacle frame 2 and at least one contact lens 3 worn by the eye of an individual in proximity to the rim of the frame.

The frame 2 bears illumination sources 20 distributed around the entire periphery of the two rims. These sources may be light-emitting diodes (LEDs) or vertical-cavity surface-emitting laser (VCSEL) diodes. The light emitted in the infrared by these sources 20 may be coherent (VCSEL) or weakly coherent (LED).

In addition, the frame 2 bears a wireless communication receiver 21. It may be an RF antenna with an RF demodulator, or an IrDA (acronym for "Infrared Data Association") receiver.

The frame 2 further incorporates a processor for processing the signals 22.

The contact lens 3, preferably a hard or hybrid scleral lens, bears by encapsulation a plurality of photoreceptors 30, preferably photodiodes, arranged in one or more different rings and angular sectors.

A wireless communication transmitter 31, suitable for communicating with the receiver 21 of the frame 2, is also encapsulated inside the contact lens 3.

The transmitter 31 may be an RF antenna or an IrDA transmitter.

An autonomous integrated circuit 32 is also encapsulated inside the contact lens 3.

The RF antenna of the transmitter 31 may act as a receiving antenna for supplying the photoreceptors 20 and the autonomous integrated circuit 32 with electrical energy. This electrical energy may advantageously be sent from the RF antenna 21 of the frame.

The contact lens 3 preferably incorporates a micro-battery in order, potentially, to store the electrical energy.

Each photoreceptor 30 may be provided with an infrared chromatic filter 33, which makes it possible to overcome the problems due to ambient light (variations, noise, etc.).

Figure 3:
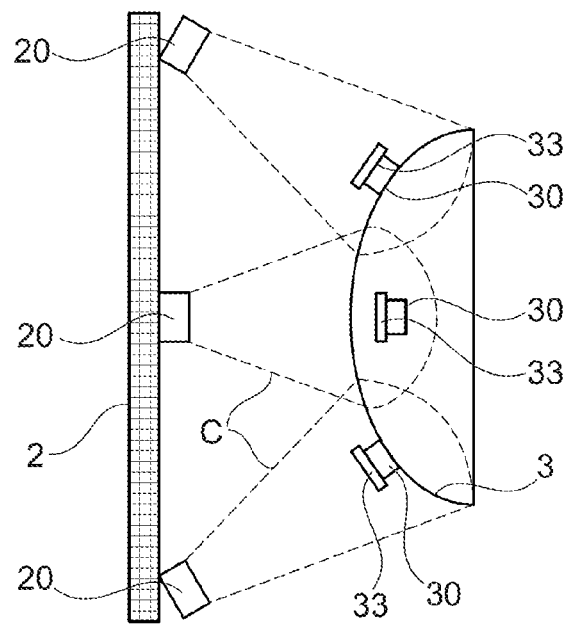
FIG. 3 is a schematic side view of an optical system according to FIG. 1.

The operation of the optical system 1 which has just been described will now be described with reference to FIGS. 3 and 4.

Beforehand, the system 1 is calibrated, by illuminating the photoreceptors 30, in order to prevent positioning errors from the outset.

The initial position of the eye wearing the contact lens 3 is thus calculated, which subsequently allows direct measurement on the lens. For example, the calibration processing may comprise the calculation of a center of mass in order to balance the photocurrents when the user looks straight ahead during the initial setup period.

When the frame 2 is worn by the face of an individual and a contact lens 3 is worn by each eye of the individual, each illumination source 20 can emit an illumination cone C which illuminates one or more photoreceptors 30.

The illumination cones C of the sources 20 may overlap at least partially at the contact lens level. The illumination may be continuous or in pulsed mode, for example in stroboscopic mode.

According to a first configuration (option 1 of FIG. 4), the sources 20 create almost uniform illumination over a planar surface tangent to the center of the contact lens 3. This corresponds to a position of the eye fixed on infinity. The number, position and orientation of these sources 20 are determined by a criterion of luminous power and of uniformity of the illumination on said surface, the size of which is equivalent to the base of the largest meniscus of the contact lens.

In a second configuration (option 2 in FIG. 4), the sources 20 may be provided with a shaping optic that creates a more concentrated beam or generates a particular shape on the contact lens. The size of the illumination spot from each source 20 is in proportion to the size of each photoreceptor 30 on the contact lens 3. In this second configuration, there is no overlap between the illumination beams.

Each photoreceptor 30 then receives a beam from an illumination source.

In these two configurations, the illumination is continuous. It is also possible to envisage using a signal that is modulated over time.

The processor 34 integrated into the autonomous circuit 32 then performs analog processing comprising the calculation of the center of mass or centers of mass of the contributions of the electrical signals (voltage or current) from the photodetectors 30.

By virtue of this calculation, the variation in the signal delivered by the photoreceptors 30 not only makes it possible to detect the closing/opening times of the eyelid and of the relative positions of the eye, according to the positioning of said photodetectors.

Figure 4:
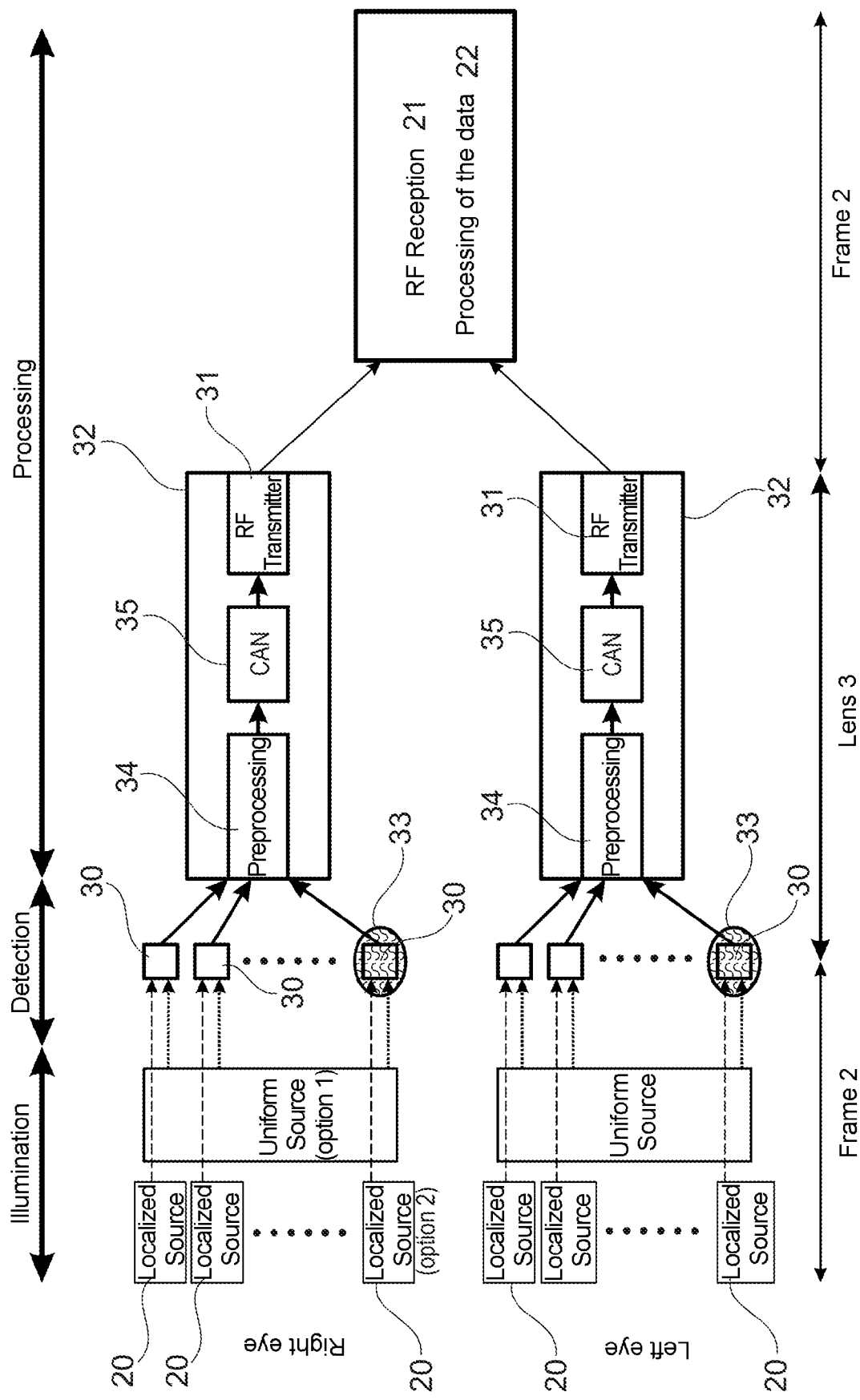
FIG. 4 is a block diagram showing the operation of an optical system according to the invention.

After being converted into digital signals by an analog-to-digital converter 35, the signals are transmitted by the transmitter 31, an RF transmitter in the example shown in FIG. 4.

The wireless communication receiver 21, integrated into the frame 2, then receives the signals from the transmitter 31 of each contact lens 3.

The processor 22 integrated into the frame 2 then performs processing for correlation between the signals from the two contact lenses 3. This correlation processing makes it possible, on the one hand, to correct any errors and, on the other hand, to obtain the information on the ocular vergence of the individual.

Figure 5:
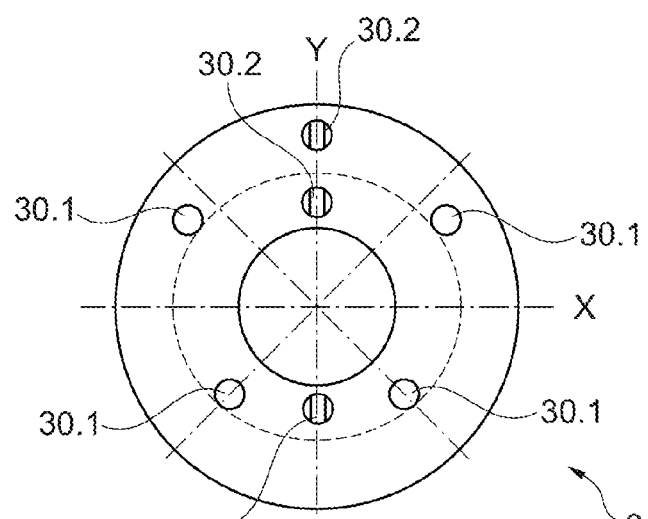
FIG. 5 is a front view of a contact lens according to one advantageous variant of the invention.

FIG. 5 shows one advantageous arrangement of the photoreceptors 20 on a contact lens 3.

According to this arrangement, at least four photoreceptors 30.1 are arranged by being distributed in pairs on either side of and at an equal distance from the axis of symmetry (X) of the contact lens 3. This axis of symmetry X is the one positioned horizontally when the lens 3 is worn by the eye.

In addition, the four photoreceptors 30.1 are distributed in pairs on either side of the axis of symmetry (Y) of the contact lens 3. This axis of symmetry Y is the one positioned vertically when the lens is worn by the eye.

The four photoreceptors 30.1 are not necessarily on the same diameter, as shown in FIG. 5.

These four photoreceptors 30.1 are dedicated to measuring movements in the horizontal plane.

At least three photoreceptors 30.2 are arranged by being aligned along the axis of symmetry (Y) of the contact lens. As can be seen in FIG. 5, it is preferable for these photoreceptors 30.2 to be more numerous in the upper portion than in the lower portion of the lens 3 in order to measure the blinking.

At least three of these photoreceptors 30.2 are dedicated to measuring the orientation in the vertical axis and the blinking of the eyelids.

This combined arrangement of the photoreceptors 30.1 and 30.2 makes it possible to very precisely extract the variations in orientation and speed of the contact lens 3.

Of course, the invention is not limited to the implementation examples which have just been described.

Further variants and improvements may be contemplated without otherwise departing from the scope of the invention.

For example, the frame may be integrated into an augmented reality headset or into a head-up display (HUD) screen.

The contact lens may incorporate a micro-battery for storing the electrical energy required for the operation of the photoreceptors and of the autonomous integrated circuit.

CITED REFERENCES

[1]: N. M. Farandos et al., "*Contact lens sensors in ocular diagnostics*", Advanced Healthcare Materials, vol. 4, no. 6, 4, pp. 792-810, April 2015.

[2]: J.-C. Chiou, Y.-C. Huang, G.-T. Yeh, "*A capacitor-based sensor and a contact lens sensing system for intraocular pressure monitoring*", Journal of Micromechanics and Microengineering, vol. 26, no. 1, 2016.

[3]: A C Sensimed "Triggerfish", http://www.sensimed.ch/fr/

[4]: D. A. Robinson, "*A Method of Measuring Eye Movement Using a Sceral Search Coil in a Magnetic Field*" IEEE Transactions on Bio-medical Electronics, vol. 10, no. 4, pp. 137-145, October 1963.

[5]: https://phys.org/news/2017-05-solution-precise-low-cost-eye-movement.html, 2017

[6]: E. Whitmire, L. Trutoiu, R. Cavin, D. Perek, B. Scally, J. Phillips, S. Patel, "*EyeContact: Scleral Coil Eye Tracking for Virtual Reality*", Proceedings of the 2016 ACM International Symposium on Wearable Computers, pp. 184-191, New York, N.Y., USA, 2016.

[7]: A. Frigerio, T. A. Hadlock, E. H. Murray, J. T. Heaton, "infrared-based blink detecting glasses for facial pacing: towards a bionic blink", JAMA facial plastic surgery, vol. 16, no. 3, pp. 211-218, 2014.

[8]: S. B. Ryann, K. L. Detweiler, K. H. Holland, M. A. Hord, V. Bracha, "*A long-range, wide field-of-view infrared eyeblink detector*", Journal of Neuroscience Methods, vol. 152, no. 1, pp. 74-82, 2006.

[9]: A. Nanditha Sree and A. Balaji Ganesh, "*Experimental study report on Opto-electronic sensor based gaze tracker system,*" 2011 International Conference on Emerging Trends in Electrical and Computer Technology, Tamil Nadu, 2011, pp. 567-570.

The invention claimed is:

1. An optical system for detecting and tracking the eye movements of an individual, comprising:
    a frame, intended to be worn on the face of the individual, comprising:
    a plurality of illumination sources,
    at least one contact lens, intended to be worn by an eye of the individual facing the frame, in which are encapsulated:
    an autonomous integrated circuit, incorporating a processor for processing the signals,
    a plurality of photoreceptors, suitable for being illuminated individually or not by the sources of the frame, the photoreceptors being electrically connected individually to the integrated circuit, the photoreceptors being arranged in the contact lens such that the processing by the processor of the signals transmitted by the photoreceptors makes it possible to know the relative positions and speeds of rotation of the eye and the blinking of the eyelid of the eye,
    a wireless communication transmitter, connected to the processor of the integrated circuit, for transmitting the signals processed by the processor of the integrated circuit and transferred to an external processor.

2. The optical system as claimed in claim 1, wherein the frame is a spectacle frame or an augmented reality headset or a head-up display screen.

3. The optical system as claimed in claim 1, wherein the illumination sources are light-emitting diodes or vertical-cavity surface-emitting laser diodes.

4. The optical system as claimed in claim 1, wherein the illumination sources are arranged around the entire periphery of the frame rim.

5. The optical system as claimed in claim 1, wherein the contact lens is a hard or hybrid scleral lens.

6. The optical system as claimed in claim 1, wherein the illumination sources are arranged such that, when the frame and the contact lens are worn by the individual, their illumination cones at least partially overlap at the contact lens level.

7. The optical system as claimed in claim 1, wherein the illumination sources are arranged such that, when the frame and the contact lens are worn by the individual, they create a substantially uniform illumination over a planar surface tangent to the center of the contact lens.

8. The optical system as claimed in claim 1, wherein the illumination sources each comprises a shaping optic such that, when the frame and the contact lens are worn by the individual, they each create a light beam that is more concentrated toward a point on the contact lens.

9. The optical system as claimed in one of the claim 1, wherein the photoreceptors are photodiodes emitting radiation in the infrared.

10. The optical system as claimed in claim 9, wherein the four photoreceptors of the first group are distributed in pairs on either side of the axis of symmetry (Y) of the contact lens, which is intended to be positioned vertically when the lens is worn by the eye.

11. The optical system as claimed in claim 1, comprising a first group of photoreceptors, comprising at least four photoreceptors arranged by being distributed in pairs on either side of and at an equal distance from the axis of symmetry (X) of the contact lens, which is intended to be positioned horizontally when the lens is worn by the eye.

12. The optical system as claimed in claim 1, comprising a second group of photoreceptors, comprising at least three photoreceptors arranged by being aligned along the axis of symmetry (Y) of the contact lens, which is intended to be positioned vertically when the lens is worn by the eye.

13. The optical system as claimed in claim 12, wherein at least two photoreceptors of the second group are arranged in the upper portion of the contact lens.

14. The optical system as claimed in claim 1, wherein the photoreceptors each are surmounted by an infrared chromatic filter.

15. The optical system as claimed in claim 1, wherein the processing by the processor of the integrated circuit comprises the calculation of the centers of mass of the contributions of the electrical signals from the photodetectors.

16. The optical system as claimed in claim 1, wherein the wireless communication transmitter is a modulator associated with a radiofrequency antenna or an infrared transmitter.

17. The optical system as claimed in claim 1, wherein the frame comprises:

a wireless communication receiver suitable for receiving the waves transmitted by the transmitter of said at least one contact lens;

a processor for processing the signals received by the receiver.

18. The optical system as claimed in claim 17, comprising two contact lenses, each intended to be worn by an eye of the individual, the processing of the signal by the processor of the frame being suitable for extracting the information on ocular vergence, on the center and on the direction of the gaze in space.

* * * * *